June 15, 1965 L. H. FERGUSON 3,189,079
EMERGENCY INNER RESERVE TANK
Filed Oct. 5, 1962
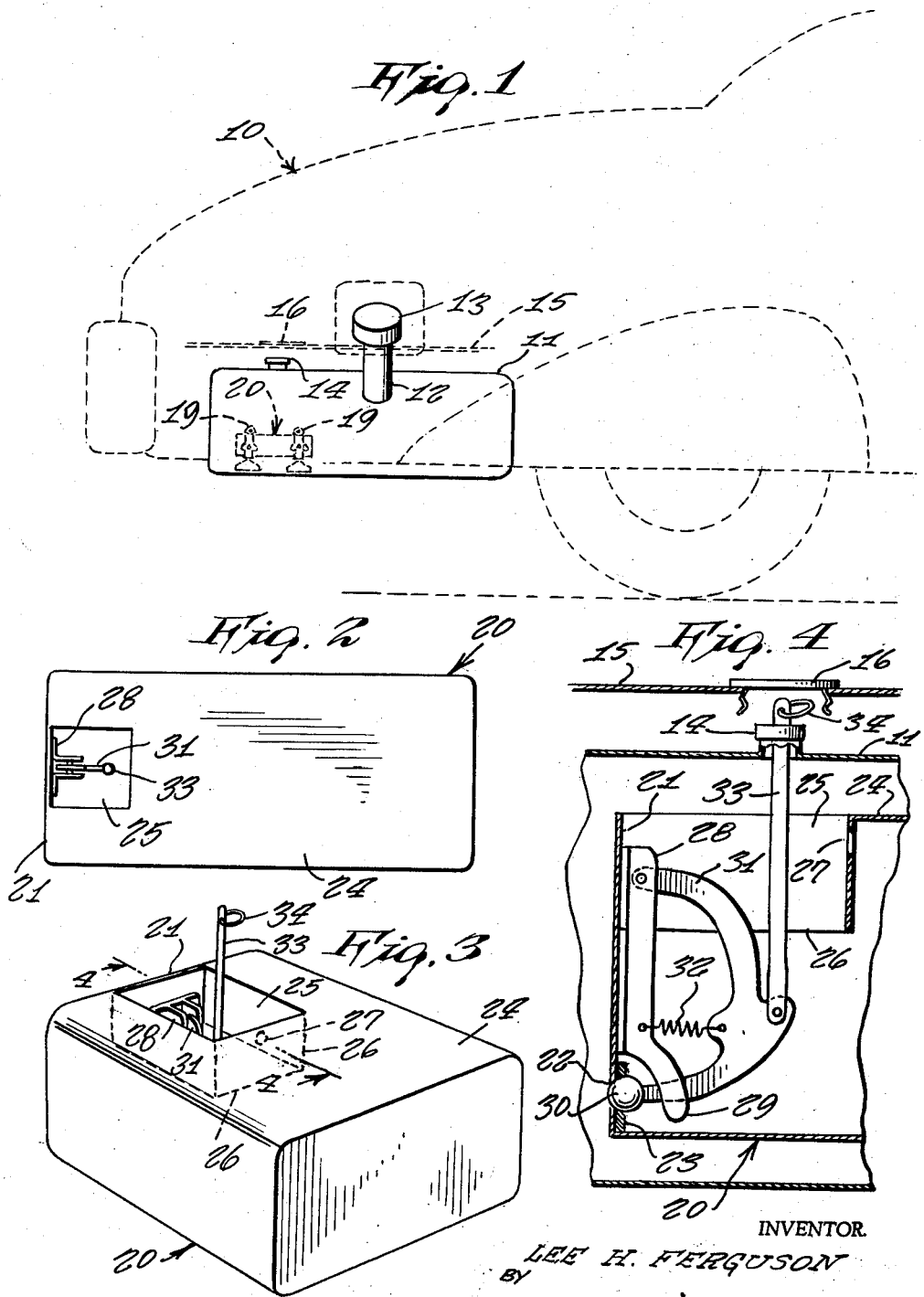
INVENTOR.
LEE H. FERGUSON
BY
Carl Miller
ATTORNEY

United States Patent Office 3,189,079
Patented June 15, 1965

3,189,079
EMERGENCY INNER RESERVE TANK
Lee H. Ferguson, 10425 Jackson Road, Dexter, Mich.
Filed Oct. 5, 1962, Ser. No. 228,574
3 Claims. (Cl. 158—46.5)

This invention relates to fuel tanks for vehicles and more specifically to means in such tanks for maintaining a reserve supply unusable until manually released.

At the present time reserve fuel supplies are provided in two ways. The first is to compensate the gage indicating means associated with a fuel tank wherein the gage indicates zero supply when all the fuel except the reserve supply is used. The second means is to provide an entrapment within the tank similar to such entrapment embodied herein.

However, the present means as noted above are normally interconnected with filler or supply delivery means as shown in U.S. Patent 1,990,605 issued February 12, 1935, to G. A. Johnson, U.S. Patent 2,135,674, issued August 2, 1938, to N. O. Gould, and U.S. Patent 2,644,514 issued July 7, 1953, to G. H. Potter.

It is necessary that reserve fuel be clean and have positive means for segregating the normal fuel supply therefrom. This is accomplished in the present application by providing positive valve means associated with no delivery or receiving conduits. Further, the reserve supply is provided during terminal filling of the tank from the upper portion thereof, thus permitting impurities to normally sink.

Accordingly, an object of this invention is to provide means for positive segregation of a clean supply of fuel within a fuel tank.

Another object of this invention is to provide the aforementioned means which includes an improved valve therefor.

And another object of this invention is to provide the foregoing means which is in constant communication with the main supply area of the tank so the segregating means is automatically refilled whenever the tank is refilled.

These and other objects and advantages will become apparent to those skilled in the art by referring to the following description and the accompanying drawings, wherein;

FIGURE 1 is an elevational view of a fuel tank made in accordance with the invention that is shown installed in a vehicle shown in phantom, FIGURE 2 is an enlarged plan view of the reserve fuel segregating means of FIGURE 1, FIGURE 3 is a further enlarged perspective view of the novel means of FIGURE 2, FIGURE 4 is a still further enlarged sectional view taken on line 4—4 of FIGURE 3.

Referring now to the drawings, and specifically FIGURE 1, a vehicle 10 has a fuel tank 11 with a normal filler neck 12 closed by a cap 13. At the top of tank 11 is an upstanding neck 14 which is closed at its upper end as illustrated, by a removable cap in the manner well known and which will be further discussed. The tank 11 is mounted, as usual, beneath the floor or bottom wall 15 of the trunk portion of vehicle 10 provided with a closure snap cap 16 in an opening in such floor 15 directly over the neck 14, as shown in FIGURE 4.

A reserve fuel tank or segregating means 20 is connected to the main fuel tank by brackets 19. The top wall 24 has an opening 25 adjacent the back wall 21, as shown. It should be understood that the opening 25 may be adjacent the front or one of the side wall of such tank 20 however, the position of the manual release means, as will be further discussed, will not be as readily accessable. Three wall portions 26 depend from the top wall 24 adjacent the opening 25 into the reserve tank area, and with wall 21 provides baffle means to prevent wash of reserve fuel into the main fuel supply area. A vent 27 is disposed at the top of one of the walls 26.

Wall 21 has an opening 22 at the bottom thereof for passing reserve fuel into the main supply area when needed. Opening 22 is normally closed by a valve 30 engaging a seat 23 that is connected to wall 21 and surrounds opening 22. Valve 30 is carried on an arm 31 pivotally connected to a bracket 28 mounted on wall 21. The bracket 28 carries at its lower end an extension 29, see FIG. 4, which has a guiding relation with the valve carrying end of the arm 31, such as to insure proper seating of the valve 30 on its seat 23 when the valve is returning to its closed position. A spring 32 is connected at its ends to bracket 28 and arm 31, and biases valve 30 onto the seat 23. A rod 33 is pivotally connected to arm 31, and extends through a sealed opening (not shown) in the closure cap on neck 14. A ring 34 is carried at the outer end of rod 33 immediately below the snap cap 16 in the trunk floor 15 of the vehicle 10.

It should now be seen that when reserve fuel is needed, cap 16 is removed from trunk floor 15 and the ring 34 is pulled. Rod 33 moves outwardly through the opening in the cap on neck 14 causing arm 31 to pivot swinging valve 30 off seat 23 and permitting the reserve fuel to flow through opening 22. Upon release of ring 34, spring 32 causes arm 31 to pivot carrying valve 30 onto seat 23. It is to be understood that the sealed opening in the cap on neck 14 is such as to permit the requisite tilting movement of rod 33 in relation to the valve arm 31.

While this invention has been described with particular reference to the construction shown in the drawings, it is to be understood that such is not to be construed as imparting limitations upon the invention, which is best defined by the claims appended hereto.

Having thus described my invention, I claim as new and desire to secure by Letters Patent:

1. In a vehicle having a trunk compartment and a main fuel tank having a fuel inlet suspended therebeneath, a reserve tank located within said main tank, bracket means securing the reserve tank to the bottom wall of said main tank, said reserve tank comprising top, bottom, side and end walls, a fuel inlet opening in said top wall disposed adjacent one end wall of said reserve tank, the upper edge of which defines one of the sides of said opening, a baffle wall structure depending from the reserve tank top wall and extending around the remaining other peripheral sides of said inlet opening and joined to said one end wall of said reserve tank, a discharge opening in said one end wall adjacent the bottom wall of said reserve tank, a valve seat surrounding said discharge opening, a bracket secured to said one end wall of said reserve tank above said valve seat, a lever arm pivoted at one end to said bracket, a valve carried by the other end of said lever arm for seating engagement on said valve seat, spring means connected to said bracket and lever arm for biasing said valve on its seat, a capped neck upstanding from the top wall of said main tank located over the inlet opening in the top wall of said reserve tank, an access opening in the floor of the trunk compartment in axial registry with said capped neck, a removable closure for said access opening, and a rod pivotally connected at its lower end to an intermediate portion of said lever arm and extending upwardly through said capped neck, the upper free end of said rod being disposed adjacent to said access opening.

2. The reserve tank of claim 1, wherein said reserve tank is positioned by its supporting bracket means elevated above the bottom wall of the main tank, a vent in said baffle wall structure adjacent the top wall of the reserve tank, said baffle wall structure and said one end wall of said reserve tank defining an inlet passageway, the upper portion of said bracket, the upper end of said lever arm pivoted thereto, and the rod connected to said lever arm being positioned within said inlet passageway.

3. The reserve tank of claim 2, including a guide extension on the lower end of said lever arm bracket having means for guiding relation with the valve carrying end of said lever arm, and said capped neck being positioned remote from the fuel inlet of said main tank.

References Cited by the Examiner

UNITED STATES PATENTS

| 1,419,145 | 6/22 | Kleinberg | 158—46.5 |
| 2,947,509 | 8/60 | Smithey et al. | 251—48 |

FOREIGN PATENTS

| 568,220 | 12/23 | France. |

JAMES W. WESTHAVER, *Primary Examiner.*

FREDERICK KETTERER, *Examiner.*